Oct. 2, 1934. K. D. LOOSE ET AL 1,975,326
CONTINUOUS SHEETING AND LAMINATING PROCESS
Filed May 23, 1932 2 Sheets-Sheet 1
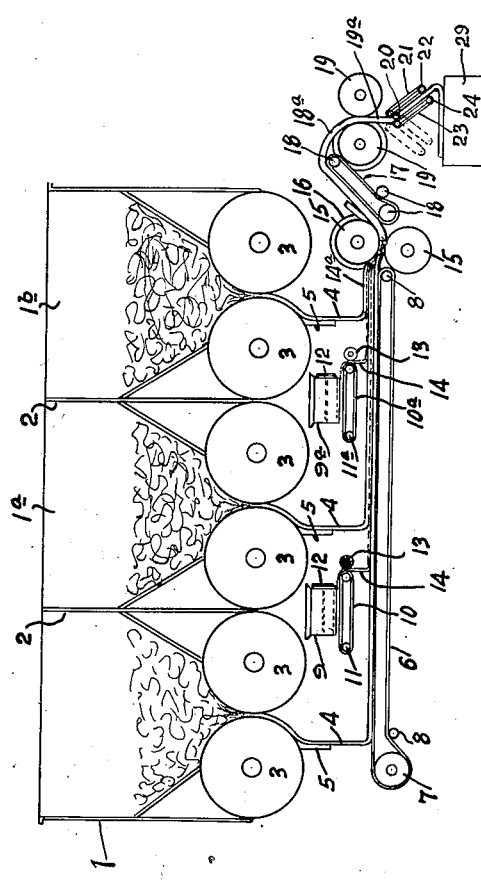
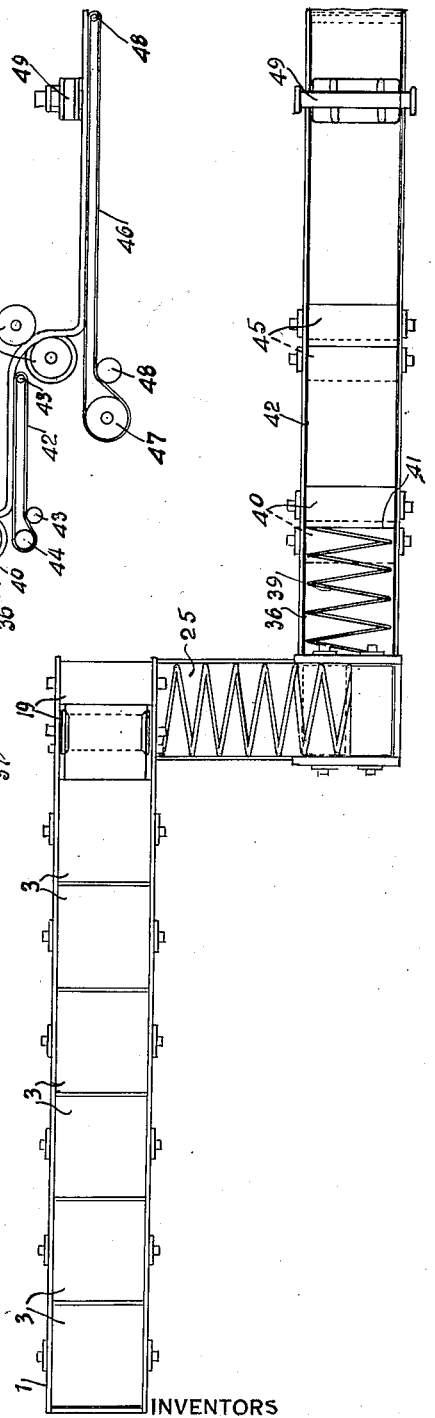
INVENTORS
KENNETH D. LOOSE,
CHARLES W. WATKINS,
BY JOSEPH W. GREEN,
Toulmin & Toulmin
ATTORNEYS Oct. 2, 1934.    K. D. LOOSE ET AL    1,975,326
CONTINUOUS SHEETING AND LAMINATING PROCESS
Filed May 23, 1932    2 Sheets-Sheet 2
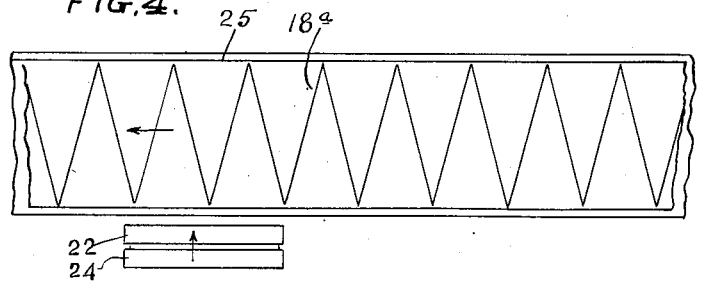
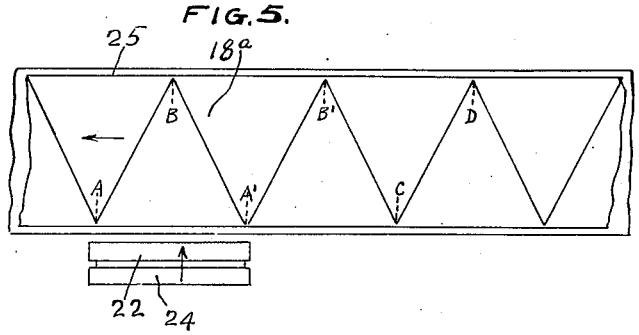
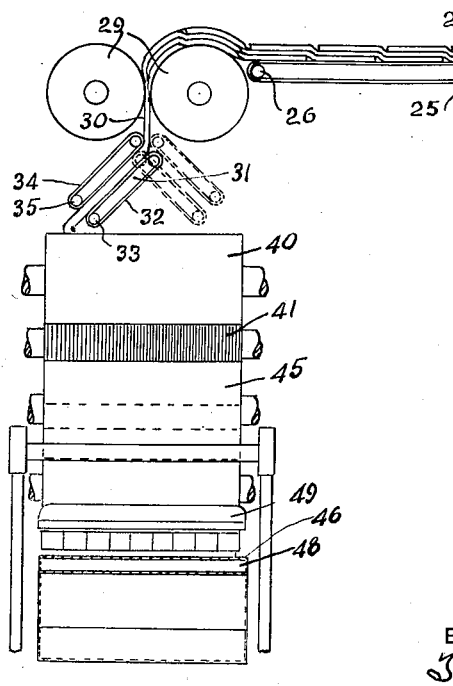
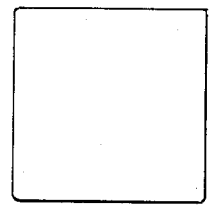
INVENTORS
KENNETH D. LOOSE,
CHARLES W. WATKINS,
BY JOSEPH W. GREEN,
Toulmin & Toulmin
ATTORNEYS

UNITED STATES PATENT OFFICE 1,975,326

CONTINUOUS SHEETING AND LAMINATING PROCESS

Kenneth D. Loose, Bronxville, N. Y., and Charles W. Watkins and Joseph W. Green, Dayton, Ohio, assignors to Loose-Wiles Biscuit Company, Long Island City, N. Y., a corporation of New York Application May 23, 1932, Serial No. 612,896

7 Claims. (Cl. 107—54)

This invention relates to the production of the bakery product known as crackers or biscuits and consists of two parts or branches, namely, a continuous method of manufacturing or producing the article, and the new article itself, thereby produced. The present application is restricted to the process of producing the article.

The general object in view is the production of a new character of biscuit or cracker, in the nature of a biscuit or cracker sandwich, the term "sandwich" being here used as descriptive of the character of the article, that is to say, the body of the biscuit or cracker is made of suitable dough, in this case treated in a certain manner, and a so-called sandwich ingredient which, though not separable from the body of the biscuit or cracker and though not necessarily visible, yet is present in the cracker, permeating it and giving it a certain crisp or semi-crisp and tender characteristic, and a light and airy condition, with the flavor of the permeating ingredient.

Referring to the method branch of our invention, we would state that it consists essentially of the following steps:

Step one, making up the dough; step two, reducing the dough to a plurality of comparatively thin continuous sheets, adapted to be extended in length and made thinner as the method of treatment proceeds; step three, laminating the continuous sheets, each succeeding one upon the preceding one, with their points of union spaced apart to expose more or less of the preceding sheet; step four, applying to such exposed sheet portion any suitable edible ingredient, in quantities sufficient to give the product a palatable flavor or taste or in such quantities as assure such flavor or taste, the sandwich material as it were, being overlaid by the next succeeding dough sheet; step five, subjecting such laminated sheets of dough and said added ingredients to pressure to form them into a single relatively thin enriched sheet; step six, laying such thin enriched sheet in overlapping folds, each fold overlapping the preceding fold, whereby a further lamination takes place; step seven, supporting the dough sheet so treated upon a moving or traveling instrumentality during the step of so folding the sheet, the component of the traveling and overlapping motions of the sheet causing each fold to partly overlie the preceding fold along an oblique line, whereby an increased lamination is effected; step eight, reducing by pressure the thus overlapped layers to a single thin sheet which constitutes the complete stock in sheet form; step nine, and then severing such last-named sheet into portions or sections, each constituting in shape and size the desired cracker product.

These and other advantages will appear from the following description taken in connection with the drawings, which disclose a preferred instrumentality for carrying out the method of producing the crackers.

Referring to the drawings:

Figure 1 is a longitudinal vertical section through a form of apparatus adapted to carry out applicants' method.

Figure 2 is a top plan view of the apparatus shown in Figure 1.

Figure 3 is an end elevation of the apparatus shown in Figures 1 and 2, looking at the right-hand end as shown in these figures.

Figures 4 and 5 are detail views showing the manner in which the sheet of dough is folded or lapped to produce therefrom another sheet of dough.

Figure 6 is a plan view of this cracker.

Figure 7 is a side elevation of the cracker or article of manufacture produced by this method.

This invention relates to a method of producing from a batch of previously prepared dough one or more continuous sheets of dough for the formation of a sandwich cracker or biscuit. The dough that has been prepared in the usual manner is placed in hoppers 1, 1a and 1b, separated by removable division walls 2. In the present instance three hoppers are shown, separated from one another by means of these removable walls 2. Any number of hoppers may be used with or without the walls 2.

At the outlet from each hopper, for the purpose of delivering the dough therefrom in the form of a continuous sheet, are two rollers 3, rotating in opposite directions, for feeding the sheet 4, (which may be separated from any roller by means of a scraper or blade 5) onto a travelling conveyor composed of a belt 6 and rollers 7 and 8. The roller 7 is a driving roller and cooperates with two other rollers 8 in properly supporting the belt. The hoppers and the pairs of rollers associated therewith are so arranged that the sheets of dough are delivered onto the travelling conveyor belt at spaced points, as clearly shown in Figure 1.

In order to apply an edible sandwich material to the different sheets of dough, hoppers 9 and 9a are provided. The hopper 9 is located between the outlet from hopper 1 and the outlet from hopper 1a, while the hopper 9a is located between the outlet from hopper 1a and the outlet from hopper 1b. Associated with the hopper 9 is a conveyor belt 10, composed of canvas or wire cloth, supported on rollers 11, while a similar canvas belt 10a, used in connection with the hopper 9a, is supported on rollers 11a.

Located in one side of the hoppers 9 and 9a is a feed gate 12, which may be adjusted to regulate the delivery of the edible or sandwich material onto the conveyor. At the delivery end of each conveyor 10 and 10a is a spreading means such as a rotary brush 13 for distributing the edible or sandwich ingredient transversely across the sheet of dough as it moves along with the conveyor belt 6.

The edible or sandwich ingredient 14 may be composed of grains, cereals, nuts, fruits, pastes, creams, fats or other edible mastics.

The sandwich material is delivered by the conveyor 10 from the hopper 9, onto the sheet of dough. After this sandwich material has been delivered and distributed over the first sheet, a second sheet of dough is applied upon such sandwich material. Thereafter, a second layer of sandwich ingredient is distributed upon the second sheet, after which a third sheet of dough is applied upon the last layer of sandwich material and this process may be repeated as often as desired.

This composite sheet, composed of the several separate continuous sheets of dough and the intervening sandwich ingredients, is indicated by the numeral 14a, and may be of any desired thickness. This composite sheet is thereafter passed between two rollers 15, which reduce its thickness.

In order to prevent the spreading of the composite sheet of dough, one of the rollers has on each end a flange 16, projecting partly across the end of the other roller. Thus far the first formed sheets of dough have been formed into a composite sheet which has passed through a set of rollers by which its thickness has been reduced and its length has been increased without increasing the width of the sheet.

As the composite sheet of dough leaves the rollers 15 it is received by a conveyor belt 17, supported and driven by rollers 18. From this conveyor the now laminated or composite sheet 18a, which may be about one inch in thickness, passes between two rollers 19, wherein its thickness is further reduced and its length correspondingly increased without changing its width.

It will be noticed that there is a constant drawing out of the composite sheet. After the sheet has passed between the rollers 19, it passes between two conveyor members supported on an oscillating frame 20. The conveyor member consists of a conveyor belt 21 and a pair of rollers 22 for supporting this belt, and a second belt 23 supported by a pair of rollers 24.

This oscillating frame supports in spaced relationship to each other these conveyors so that as the sheet of dough is fed between the rollers 19 in a sheet 19a, this sheet passes between the two conveyors. This oscillating frame is supported at its upper end and operated to swing transversely of a lower conveyor belt 25.

As the frame 20 oscillates back and forth across the conveyor belt 25, the sheet of dough is deposited on the belt in transverse layers extending from one side of the belt to the other. The number of layers deposited one on the other depends upon the speed at which the conveyor belt 25 moves. The manner in which the oscillating frame delivers the sheet of dough to the conveyor belt 25 is illustrated in Figure 4, in which are shown the two lower rollers of the oscillating frame. Between these rollers 22 and 23 the sheet of dough passes, and as these rollers move from one side of the conveyor belt 25 to the other the sheet will be deposited in overlapping layers on the belt. If the belt is stationary the sheet will be deposited directly across the conveyor belt at right angles to the sides thereof, but should the conveyor belt be moving in the direction indicated by the arrow the sheet of dough will be disposed diagonally with respect to the belt.

Let it be assumed that the lower end of the oscillating arm with the rollers 22 and 23 thereon is in the position A—A', and the conveyor belt is moving with one-half the velocity that the lower end of the frame is swinging. Then as the frame swings from the position A—A', across the belt, the sheet will take the direction indicated by the line A—B, and after it has delivered the sheet of dough on top of the conveyor belt, it will be in the position B—B' with respect to the belt.

As the lower end of the oscillating frame moves back to its original position, it will move from the position B—B' to the position A'—C. After the lower end of the frame has assumed the position A'—C a second swinging of the oscillating frame across the conveyor belt will cause it to assume the position B'—D, with regard to the belt.

It will be observed that these oscillations take place with a sufficient degree of rapidity that a multiple ply of the sheet of dough is placed upon the conveyor belt. If the speed of the oscillating frame were increased, with relation to the speed of the conveyor belt, a larger number of plies of dough would be deposited on the belt. Any number of plies may be deposited one on top of the other.

The conveyor belt 25 is supported by means of a drive roller 27 and a pair of rollers 26. The sheet of dough formed in the manner herein described in connection with Figure 4 is indicated by the numeral 28, which includes as many plies of the material as received from the rollers 19. The sheet of material 28 is delivered by the conveyor 25 to a pair of rollers 29, which still further reduces the thickness of the strip.

From these two rollers the sheet of dough 30 is delivered to a pair of oscillating belts carried by an oscillating frame 31, similar to the oscillating frame 20. This frame has a belt 32 supported by rollers 33 and a second belt 34, supported parallel to the belt 32 by means of rollers 35. This frame is supported to oscillate across a belt conveyor 36 which receives the sheet as it passes between the belts 32 and 34. These belts are suitably driven, and the frame is caused to oscillate back and forth across the belt conveyor 36, to which the sheet is delivered in the same manner that the sheet was delivered to the belt 25.

The belt conveyor 36 is supported by a driving roller 38 and two other rollers 37. As this belt conveyor travels the material is delivered transversely thereof in layers or folds, indicated by the numeral 39. There may be any desired number of layers. The thickness of the resulting sheet depends upon the number of folds or laps.

This sheet is delivered by the conveyor 36 to a pair of rollers 40, similar to rollers 15, which reduce the thickness of the sheet of dough and increase its length. As the sheet passes from these two rollers it is indicated by the numeral 41 and is received on a conveyor belt 42, supported by rollers 43 and a driving roller 44.

This sheet may be of various degrees of thickness, and is conveyed by means of the conveyor belt 42 to a pair of gauging rollers 45 where it is still further compressed.

From these rollers 48 (which are the gauging rollers of a biscuit cutting machine) this sheet of dough is directed to a conveyor belt 46, supported by means of a driven roller 47 and two other rollers 48, and the sheet having been reduced to the proper thickness is conveyed to the cutter 49 for cutting the sheet into sections of proper size to constitute biscuits or crackers.

Method branch

The method branch of our invention comprises a series of steps or acts which deal with, and change the physical size, shape and condition of the dough from which the biscuit or cracker is made. We shall now enumerate the several steps, their relation to each other, their effect upon the raw material, and the preferred order in which the steps are performed. And it is to be observed, also, that two or more of the steps, aside from all of the steps, have a cooperating relation, so that such subdivisions of the steps will constitute subject matter for separate claims, in addition to appropriate claims embracing all of the essential steps.

Step 1

Step 1 comprises the acts or work of making up the dough in one or more bulks. Such dough is made up in the usual way known in the biscuit or cracker-making art, and is appropriate in kind for cracker production.

Step 2

Step 2 comprises acts or operations which reduce the dough to a plurality of comparatively thin continuous sheets. These sheets are made thinner and extended in length, but not necessarily wider, as the method of treatment proceeds.

Step 3

Step 3 involves the laminating or overlaying of the several continuous sheets one upon the other, with the points of union spaced apart so as to expose more or less of the upper surface of the preceding sheet to make it available for the next step.

Step 4

Step 4 consists in applying to such exposed portions of each sheet, excepting the last sheet in any series, of any suitable edible as cereals, nuts, fruits, pastes, creams or other edible mastics, all to be applied in quantities sufficient to give the product a palatable flavor or taste or in such quantities as desired, and, in the case of shortening materials, to give the resulting biscuit or cracker a sufficiently tender, crisp and light quality. These several materials we class as sandwich material to distinguish the laminations which they comprise in the building up of the product. Each so-called sandwich coating or quantity is overlaid by the next succeeding sheet of dough.

Step 5

Step 5 comprises subjecting such laminated continuous sheets of dough and sandwich ingredients to pressure, preferably applied successively, one act of pressure after the other, as a means to form them into what is to become a single body of biscuit or cracker dough laminated with such flavoring or shortening ingredient.

Step 6

Step 6 involves laying such enriched laminated continuous sheets, now in the form of one sheet because of having been reduced to that, in overlying folds, each fold overlapping the preceding fold. Each fold, therefore, makes a further lamination of the now sheet of stock.

This step may be repeated. In the apparatus we describe and illustrate, we provide for such repetition of step 6. Sometimes the repetition will be employed and sometimes not according to choice or other matters not affecting the scope of this invention.

Step 7

The 7th step involves supporting the dough sheet so treated upon a moving or traveling instrumentality during the step of so overlapping the sheet in a succession of folds. Thus the material is undergoing, in this 7th step, two movements, one a traveling movement and the other a substantially transverse movement, back and forth to cause an overlapping or folding of the sheet on itself. The component or result of such traveling or straightaway movement and such lateral movement results in causing each fold to partially overlie the preceding fold along an oblique line, which further laminates the now stock sheet of dough. Such motions also result in each folded section of the dough sheet overlapping in part the preceding lap and extending in part beyond the preceding lap. The angularity of the folds to the line of travel will depend upon the relative speed of the overlapping and traveling instrumentalities. These speeds and their relation to each other can be varied through a wide range of variation, so that no particular speeds or relative speeds are specially material. The essence of this step is that the now thin sheet of stock material or dough is further laminated in folds upon itself.

Step 8

Step 8 comprises reducing by pressure, or otherwise, the now overlaid layers from their overlapped bulk to a thinner state or sheet which will constitute the complete stock product in continuous sheet form.

Step 9

And finally, the 9th step is performed by severing such last-named sheet into portions or sections, each constituting in shape and size the desired biscuit or cracker product, now ready to be baked—a step not involved in our invention because the act of baking as generally employed will suffice in the case of this new product.

Article branch

This article constitutes the second branch of this invention, and comprises a new article of manufacture formed of continuous laminations or layers of said biscuit or cracker material or stock, with its interposed edible and palatable ingredients, the latter introducing into the article its so-called sandwich character. The cracker is flaky, is tender, is susceptible of having various flavors, according to which of the edible ingredients are used; and is capable of different degrees of tenderness. These qualities are noticeable, some of them by the mere breaking of the biscuit or cracker, and others by the sense of taste.

This product or article, thus constructed, is a laminated mass when completed.

We desire to comprehend, as within our invention, such modifications as may be embraced as coming within the scope and meaning of our claims appended hereto and within the scope of this invention in both of its branches.

Having thus fully described our invention, what we claim as new and desire to secure by Letters Patent, is:

1. The continuous method of producing biscuits or crackers consisting of the following steps: step 1, making up the dough; step 2, reducing the dough to a plurality of continuous sheets adapted to be lengthened and thinned by such step; step 3, laminating two or more continuous sheets; step 4, applying between such continuous sheets a suitable ingredient to give the product a palatable flavor or taste; step 5, subjecting such laminated continuous sheets and said ingredient to pressure to reduce said sheet to a relatively thin enriched continuous sheet; step 6, laying such enriched continuous sheet in overlapping folds to produce a further lamination; step 7, supporting the continuous sheet so treated upon a traveling instrumentality during such overlapping step; step 8, reducing the overlapped layers to a thin continuous sheet to constitute the completed stock in continuous sheet form; and step 9, severing such continuous stock sheet into sections constituting in shape and size the desired biscuit or cracker product.

2. The continuous method of producing biscuits or crackers consisting of the following steps: step 1, making up the dough in a plurality of bulks, placing each bulk in a separate location; step 2, feeding a continuous sheet of dough from each bulk, preserving substantially each continuous sheet's width; step 3, laminating or overlaying the continuous sheets one upon another, spacing apart the points of union to expose the upper surface of each continuous sheet, except the last continuous sheet in any series, applying a suitable ingredient to give the product a palatable flavor or taste and/or a shortening ingredient, such ingredients constituting a sandwich component; step 5, subjecting such laminated continuous sheets of dough and sandwich ingredients to successive pressures, to form said continuous sheets into a single continuous sheet of biscuit or cracker material; step 6, laying such enriched continuous sheets in overlapping folds to increase the number of laminations of the continuous sheet stock; step 7, supporting the continuous dough sheet so treated upon a moving instrumentality during the overlapping operation, thus causing the material to have two movements, one a lapping and the other a traveling movement; step 8, reducing the now overlaid layers from their overlapped bulk to a thinner state to constitute a completed product in continuous sheet form; and step 9, performed by severing such last-named sheet into portions each constituting in shape and size the desired biscuit or cracker product stock, ready to be baked.

3. The continuous method of producing biscuits or crackers consisting of the following steps: step 1, comprising making up dough in two or more separate bulks, placing each bulk to itself; step 2, comprising drawing from each bulk a separate thin continuous sheet of dough, extending such continuous sheets in length and reducing them in thickness, without changing their essential width as the method proceeds; step 3, laminating the several continuous sheets one upon the other, with the points of contact spaced apart to expose more or less of the upper surface of each preceding continuous sheet; step 4, applying to such exposed portions of each continuous sheet, except the last in the series, a suitable edible as cereals, nuts, fruits, pastes, creams or other edible mastics, and/or a suitable shortening ingredient, to constitute a sandwich-like ingredient in laminations; step 5, subjecting such laminated continuous sheets of dough and sandwich ingredients to successive pressures to form them into a single body of cracker dough with flavoring and/or shortening ingredients; step 6, laying such enriched laminated continuous sheets, now in the form of a single continuous sheet in overlying folds, each succeeding fold overlapping the preceding fold; step 7, supporting such continuous dough sheet so treated upon a traveling instrumentality during the step of overlapping to give the material two movements, one a traveling movement and the other a transverse overlapping movement, whereby each fold assumes an oblique position which more perfectly laminates the dough; step 8, comprising reducing by pressure the now overlaid layers from their overlapped bulk to a thinner state or continuous sheet to constitute the completed stock in continuous sheet form; and step 9, comprising severing such last-named continuous sheet into sections, each constituting in shape and size the desired biscuit or cracker product stock, ready to be baked.

4. In the continuous method of producing biscuits or crackers, the following steps: step 1, comprising making up dough in separate bulks, placing each bulk in a separate compartment, the compartments arranged in series; and step 2, comprising reducing the dough to a plurality of comparatively thin continuous sheets, one continuous sheet proceeding from each bulk, the continuous sheets being extended in length and formed into a laminated sheet and made thinner but not necessarily wider as the continuous method proceeds, and looping the laminated sheet back and forth to form another sheet.

5. The continuous method of producing biscuits or crackers consisting of the following steps: step 1, producing one or more bulks of dough; step 2, reducing the dough to a plurality of continuous sheets adapted to be lengthened and thinned by such step; step 3, laminating two or more of such continuous sheets; step 4, applying between such continuous sheets a suitable ingredient to give the product a palatable flavor or taste and in such quantity as desired; step 5, subjecting such laminated continuous sheets and such ingredient to pressure to reduce said continuous sheet to a relatively thin enriched continuous sheet; step 6, laying such enriched continuous sheet in overlapping folds to produce a further lamination; step 7, in supporting the continuous sheet so treated upon a traveling instrumentality during the overlapping step; step 8, reducing the overlapped continuous layers to a thin continuous sheet; and repeating the 6th, 7th and 8th steps before executing the 9th step; and step 9, severing such continuous stock sheet into sections constituting in shape and size the desired biscuit or cracker product.

6. The method of producing biscuits which consists in continually producing a plurality of sheets of dough, causing the sheets to move and be superimposed one upon the other to form a laminated sheet, causing the laminated sheet to be fed onto a moving instrumentality, and causing the composite sheet to be looped back and forth as it is fed onto the moving instrumentality, whereby a new sheet is formed of partially overlapping folds.

7. The method of producing biscuits which consists in continually producing a plurality of sheets of dough, causing the sheets to move and be superimposed one upon the other to form a laminated sheet, causing the laminated sheet to be fed onto a moving instrumentality, causing the composite sheet to be looped back and forth as it is fed onto the moving instrumentality, whereby a new sheet is formed of partially overlapping folds, and pressing the new sheet on the moving instrumentality to reduce its thickness.

KENNETH D. LOOSE.
CHARLES W. WATKINS.
JOSEPH W. GREEN.